United States Patent
Chu et al.

(10) Patent No.: US 7,676,547 B2
(45) Date of Patent: Mar. 9, 2010

(54) SYSTEM FOR PROCESSING INFORMATION INCLUDING A MAIL SUBJECT OF AN E-MAIL NOT INCLUDING ALL CONTENTS OF THE E-MAIL FOR CONTROLLING DELIVERY OF THE MAIL SUBJECT REQUESTED BY A HOST AND METHOD THEREOF

(75) Inventors: Chin-Li Chu, Kao-Hsiung (TW); Jain-Li Lai, Taipei (TW)

(73) Assignee: ZyXEL communications Corp., Hsinchu (TW)

( * ) Notice: Subject to any disclaimer, the term of this patent is extended or adjusted under 35 U.S.C. 154(b) by 679 days.

(21) Appl. No.: 11/534,223

(22) Filed: Sep. 22, 2006

(65) Prior Publication Data

US 2008/0077674 A1    Mar. 27, 2008

(51) Int. Cl.
G06F 15/16 (2006.01)
(52) U.S. Cl. ........................................ 709/206
(58) Field of Classification Search .................. 709/206
See application file for complete search history.

(56) References Cited

U.S. PATENT DOCUMENTS

| | | | |
|---|---|---|---|
| 6,816,885 B1* | 11/2004 | Raghunandan | 709/206 |
| 2002/0065748 A1* | 5/2002 | Taniguchi et al. | 705/27 |
| 2002/0178228 A1* | 11/2002 | Goldberg | 709/206 |
| 2003/0135566 A1* | 7/2003 | Nishiguchi et al. | 709/206 |
| 2003/0204568 A1* | 10/2003 | Bhargava et al. | 709/206 |
| 2003/0208567 A1* | 11/2003 | Gross | 709/220 |
| 2006/0031318 A1* | 2/2006 | Gellens | 709/206 |
| 2006/0036690 A1* | 2/2006 | O'Neil | 709/206 |
| 2006/0095966 A1* | 5/2006 | Park | 726/22 |
| 2006/0101334 A1* | 5/2006 | Liao et al. | 715/523 |
| 2006/0168244 A1* | 7/2006 | Anderson et al. | 709/227 |
| 2006/0288076 A1* | 12/2006 | Cowings et al. | 709/206 |
| 2007/0011246 A1* | 1/2007 | Wu | 709/206 |
| 2007/0043813 A1* | 2/2007 | Pickup | 709/206 |
| 2007/0214220 A1* | 9/2007 | Alsop et al. | 709/206 |
| 2007/0283000 A1* | 12/2007 | Proux et al. | 709/224 |
| 2008/0022097 A1* | 1/2008 | Gillum et al. | 713/168 |

* cited by examiner

*Primary Examiner*—Krisna Lim
(74) *Attorney, Agent, or Firm*—Winston Hsu

(57) ABSTRACT

A system for processing an e-mail is disclosed. The system includes: a host, for issuing a first request to get a mail subject of the e-mail; a first server, for sending a first information associated with the e-mail, wherein the first information includes at least the mail subject and does not include all mail contents of the requested e-mail; a second server, for analyzing a second information to determine whether or not the mail subject is delivered to the host and then outputting an analysis result; and a parser, for receiving the information, outputting the second information to the second server, and directing the mail subject to the host if the analysis result indicates the parser should deliver the mail subject to the host.

13 Claims, 4 Drawing Sheets

SYSTEM FOR PROCESSING INFORMATION INCLUDING A MAIL SUBJECT OF AN E-MAIL NOT INCLUDING ALL CONTENTS OF THE E-MAIL FOR CONTROLLING DELIVERY OF THE MAIL SUBJECT REQUESTED BY A HOST AND METHOD THEREOF

BACKGROUND OF THE INVENTION

1. Field of the Invention

The invention relates to a system for processing an e-mail and method thereof, and more specifically, to a system for processing information including a mail subject of an e-mail not including all contents of the e-mail for controlling delivery of the mail subject requested by a host and method thereof.

2. Description of the Prior Art

Due to the volume of spam mail increasing on a daily basis, more and more network appliance vendors have proposed solutions for detecting spam mail. Briefly, there are two scenarios for analyzing spam mail.

Please refer to FIG. 1. FIG. 1 is a block diagram of a system 100 for detecting a spam mail according to the related art. The system 100 includes a host 110, a gateway 120 and a mail server 130. In a first scenario the mail server 130 stores a plurality of e-mails. The host 110 issues a mail request to get a desired e-mail. The gateway 120 is coupled to the host 110 and the first server 130 for transmitting the requested e-mail to the addressee (the host 110). Please note that the gateway 120 is an MTA (Mail Transport Agent) in the system 100. The MTA acts as a mail server of the host 110 for receiving the mail request issued from the host 110 and further serves as a mail client of the mail server 130 for issuing another mail request to the mail server 130 to get the e-mail requested by the host 110. The gateway 120 stores the whole mail on the network appliance storage and analyzes these mails utilizing a vendor's methodology (for example, a white list or a black list, fingerprint, IP address, DNS, etc.). This is the most popular implementation for a network appliance vendor.

Please refer to FIG. 1 again. In another scenario based on the system architecture shown in FIG. 1, the gateway 120 acts as a transparent mail parser on the network appliance. When the host 110 sends a spam mail to the mail server 130, the mail parser 120 analyzes this traffic and activates the anti-spam function directly. There will be no additional storage on the network appliance and this implementation is called a stream-based anti-spam methodology.

Normally, the stream-based anti-spam methodology is not used for supporting IMAP protocol because this protocol supports fetching a mail subject without any mail contents. On the other hand, the e-mail can be stored and shared on the mail server 130. The stream-based anti-spam methodology cannot analyze the e-mail by the mail subject only, so the network appliance will analyze the same e-mail many times because the e-mail is shared/stored on the mail server 130 and not moved to the host 110 that requested the e-mail.

Therefore, a new and novel system architecture is needed to provide a stream-based anti-spam system that supports the IMAP protocol.

SUMMARY OF THE INVENTION

It is therefore one of the objectives of the claimed invention to provide a system for processing an e-mail on IMAP according to a stream-based fashion. According to an embodiment of the present invention, the system comprises a host, for issuing a first request to get a mail subject of the e-mail; a first server, for sending a first information associated with the e-mail in response to a specific request associated with the first request, wherein the first information includes at least the mail subject and does not include all mail contents of the requested e-mail; a second server, for analyzing a second information to determine whether or not the mail subject is delivered to the host and then outputting an analysis result; and a parser, coupled to the host, the first server, and the second server, for receiving the first information, outputting the second information according to the received information to the second server, and directing the mail subject to the host if the analysis result indicates the parser should deliver the mail subject to the host.

It is therefore one of the objectives of the claimed invention to provide a method for processing an e-mail on IMAP according to a stream-based fashion. According to an embodiment of the present invention, the method comprises utilizing a host to issue a first request to get a mail subject of the e-mail; outputting a first information associated with the e-mail in response to a specific request associated with the first request, wherein the first information includes at least the mail subject and does not include all mail contents of the requested e-mail; outputting a second information according to the first information; analyzing the second information to determine whether or not the mail subject is delivered to the host and then outputting an analysis result; and directing the mail subject to the host if the analysis result grants a delivery of the mail subject to the host.

These and other objectives of the present invention will no doubt become obvious to those of ordinary skill in the art after reading the following detailed description of the preferred embodiment that is illustrated in the various figures and drawings.

DETAILED DESCRIPTION

Please note that certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Figure 1:
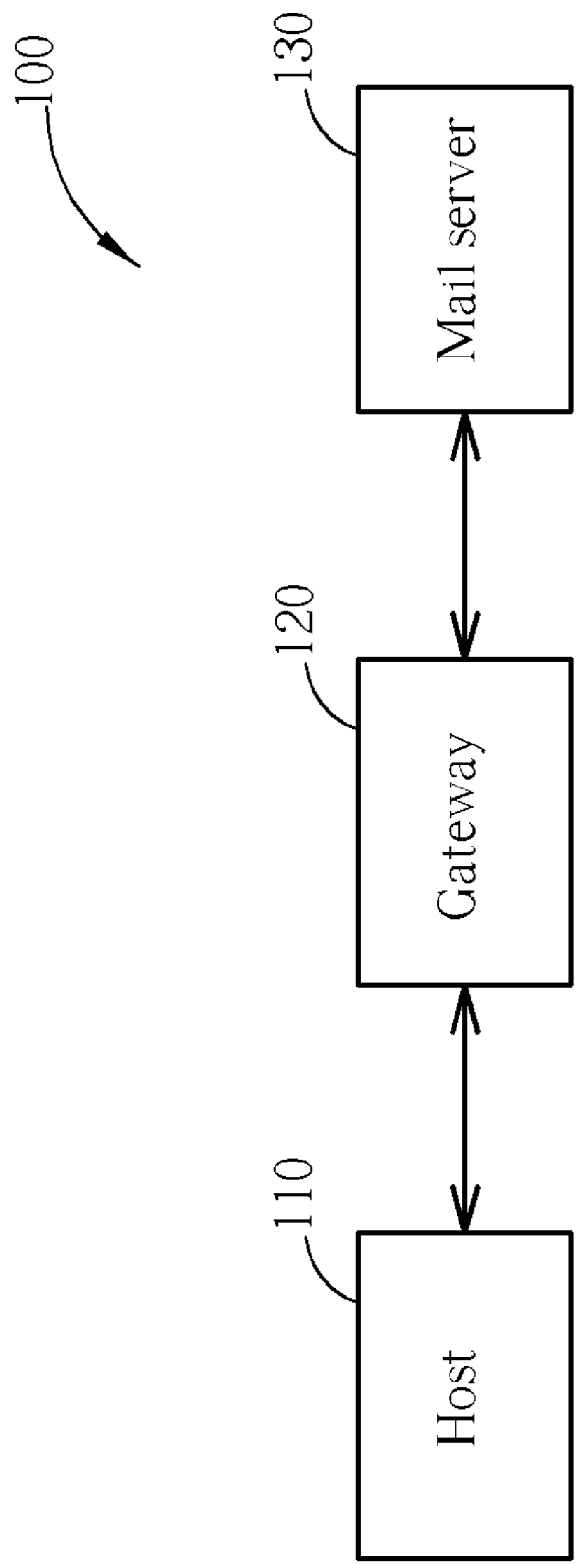
FIG. 1 is a block diagram of a system 100 for detecting a span mail according to the related art.
Figure 2:
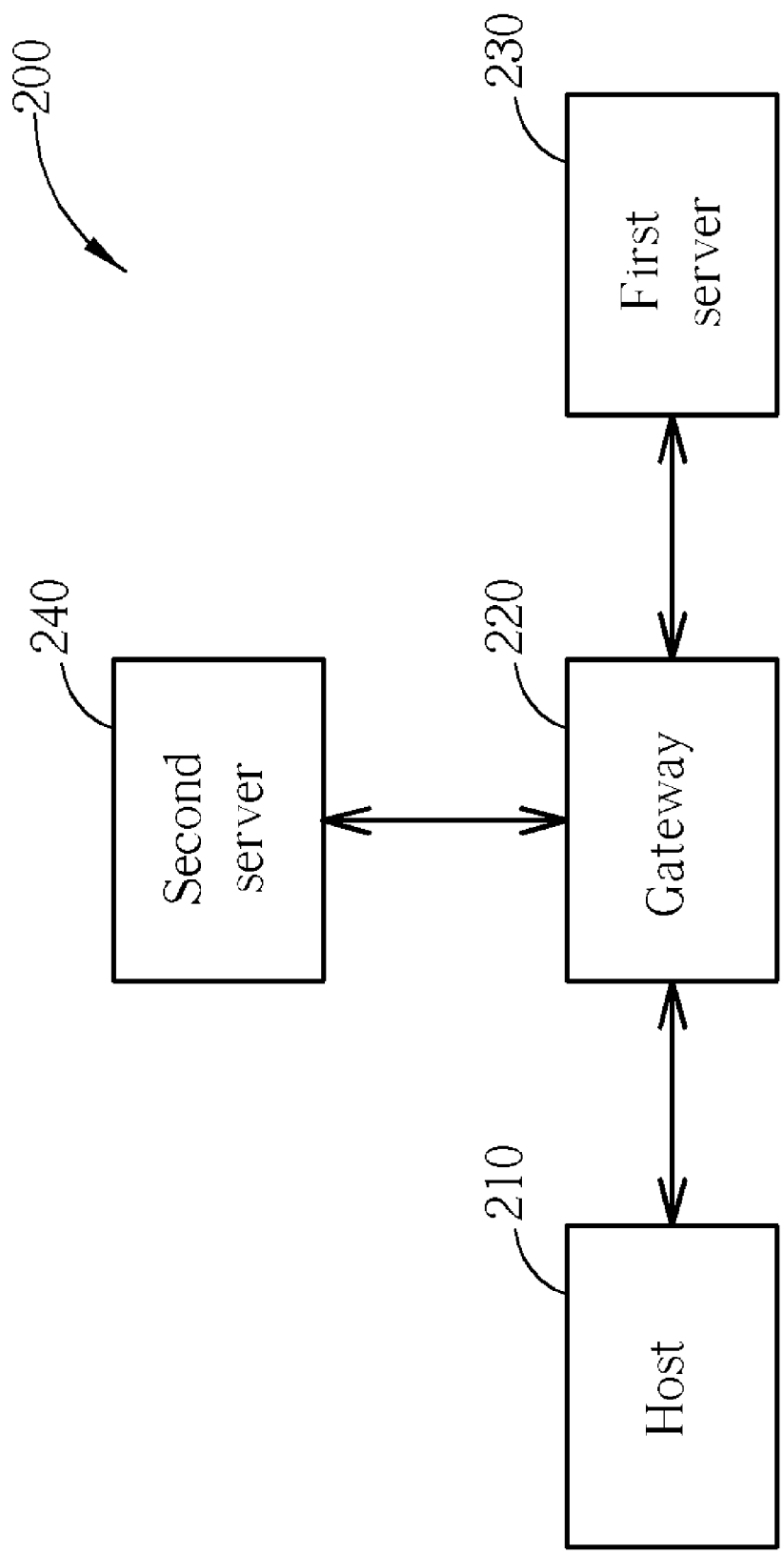
FIG. 2 is a block diagram of a system 200 for processing an e-mail according to an embodiment of the present invention.

Please refer to FIG. 2. FIG. 2 is a block diagram of a system 200 for processing an e-mail according to an embodiment of the present invention. As shown in FIG. 2, the system 200 includes a host 210, a parser (or gateway) 220, a first server 230 and a second server 240. The host 210 initially issues a first request to get a mail subject of the e-mail, wherein the first request complies with an IMAP protocol. The parser 220 is coupled to the host 210 for receiving the first request issued by the host 210 and then outputting a specific request to request a first information including at least the mail subject of the e-mail. In a case requiring additional data for anti-spam operation, the parser 220 outputs the specific request to request a first information including both the mail subject of the e-mail and a partial mail content of the e-mail. In this embodiment, the parser 220 intercepts the first request and then generates a second request as the aforementioned specific request according to the first request. However, this is not meant to be a limitation of the present invention. The first server 230 is coupled to the parser 220 for receiving the specific request and then sending the first information associated with the e-mail to the parser 220 in response to the specific request, wherein the first information includes at least the mail subject and does not include all mail contents of the requested e-mail. The key feature of the system 200 shown in FIG. 2 is the use of the second server 240 external to the parser 220. The second server 240 operates in a stream-based fashion, and is coupled to the parser 220 for analyzing the information to determine whether or not the mail subject is delivered to the host 210 and then outputting an analysis result accordingly. In this embodiment, the parser 220 is coupled to the host 210, the first server 230, and the second server 240, for receiving the first information, outputting the second information according to the received first information to the second server 240, and directing the mail subject to the host 210 if the analysis result indicates the parser 220 should deliver the mail subject to the host 210.

Figure 3:
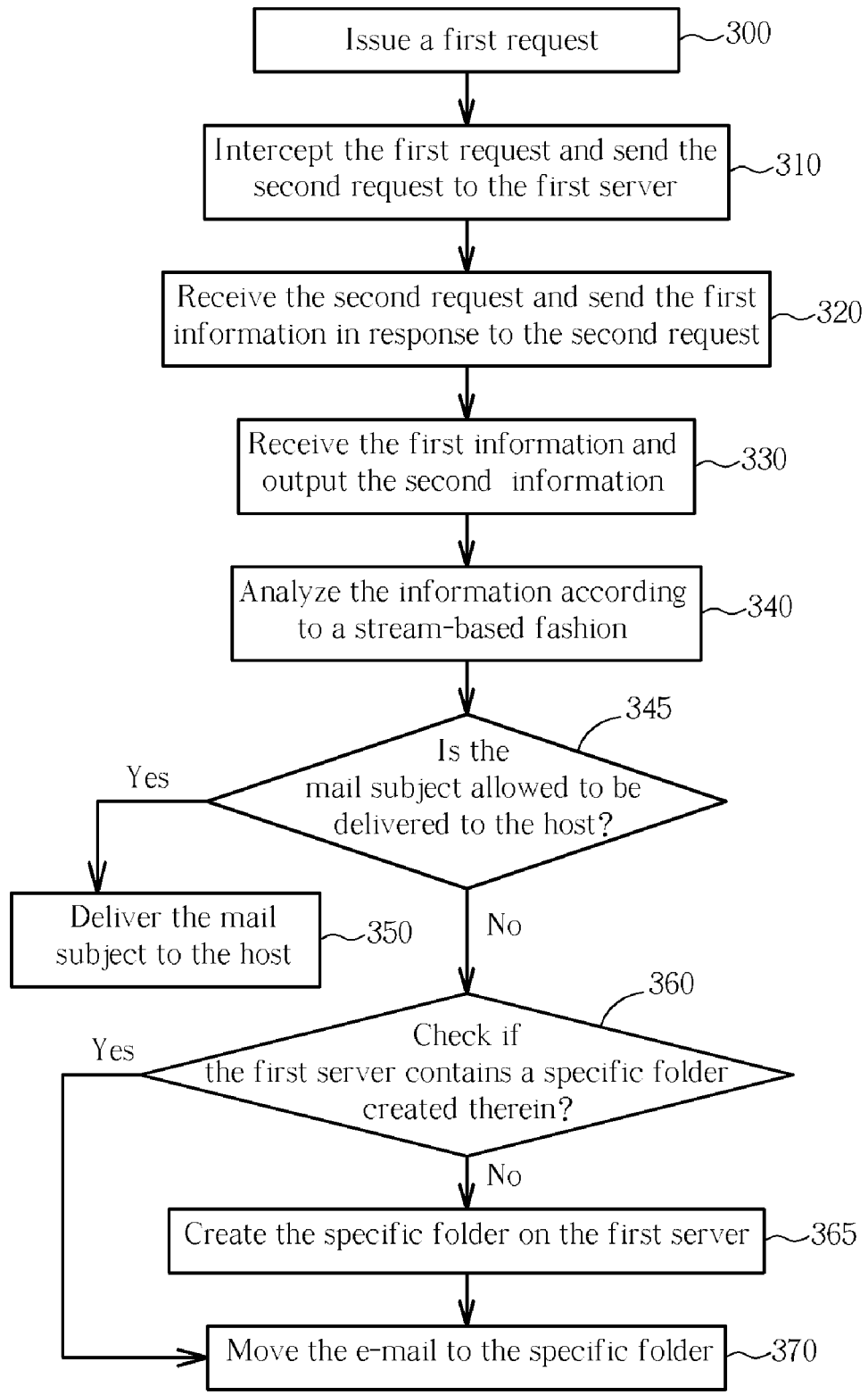
FIG. 3 is a flowchart illustrating one method employed by the system 200 for processing an e-mail.

Please refer to FIG. 3 in conjunction with FIG. 2. FIG. 3 is a flowchart illustrating one method employed by the system 200 for processing an e-mail. The e-mail processing is summarized as follows:

Step 300: Issue a first request. The host 210 issues a first request to get a mail subject of the e-mail.

Step 310: Intercept the first request and send the second request to the first server 230. The parser 220 intercepts the first request and sends the second request to the first server 230, wherein the second request will request the first server 230 to send the mail subject of the requested e-mail to the host 210.

Step 320: Receive the second request and send the first information in response to the second request. The first server 230 receives the specific request and sends the first information associated with the requested e-mail in response to the second request generated in reference to the first request.

Step 330: Receive the first information and output the second information. The parser 220 receives the first information and outputs the second information according to the received first information to the second server 240 for further data processing.

Step 340: Analyze the information according to a stream-based fashion. The second server 240 analyzes the second information to determine whether or not the mail subject is delivered to the host and then outputs an analysis result to the parser 220.

Step 345: Is delivery of the mail subject to the host allowed? If yes, go to step 350; otherwise, go to step 360.

Step 350: Deliver the mail subject to the host. The parser 220 will deliver the mail subject to the host 210 if the received analysis result grants the mail subject delivery.

Step 360: Check if the first server contains a specific folder created therein. If yes, go to step 370; otherwise, go to step 365.

Step 365: Create the specific folder on the first server. The parser 220 sends a first command to the first server 230 for creating the specific folder on the first server 230 utilized for storing the moved e-mail.

Step 370: Move the e-mail to the specific folder. The parser 210 sends a second command to the first server 230 for moving the e-mail to the specific folder.

Please note that the second information is identical to the first information, and the second server 240 analyzes the second information according to an anti-spam scheme, such as referencing a white list and/or a black list, to determine whether or not the mail subject is delivered to the host and then outputs an analysis result (Step 340). If the e-mail is recognized as using the white list, the analysis result will indicate the parser 220 should deliver the mail subject to the host 210 (Step 350). On the contrary, if the e-mail is recognized as using the black list, the analysis result will indicate the parser 220 should not deliver the mail subject to the host 210. If the first server 230 has no folder specified for storing spam mails, the parser 220 initially sends a first command to the first server for creating the specific folder on the first server (Steps 360 & 365), and then sends a second command to the first server 230 for moving the e-mail identified as a spam mail to the specific folder (Step 370). Additionally, supposing that the first server 230 has the specific folder specified for storing spam mails, the parser 220 directly sends a second command to the first server 230 for moving the e-mail identified as a spam mail to the specific folder (Steps 360 & 370).

After the above steps are executed, the host 210 only shows mail subjects of non-spam mails and the spam mails are moved to the customized folder. The operation and functionality of the anti-spam scheme using the white list and/or the black list are well known to those skilled in this art; therefore further description is not detailed for brevity.

Figure 4:
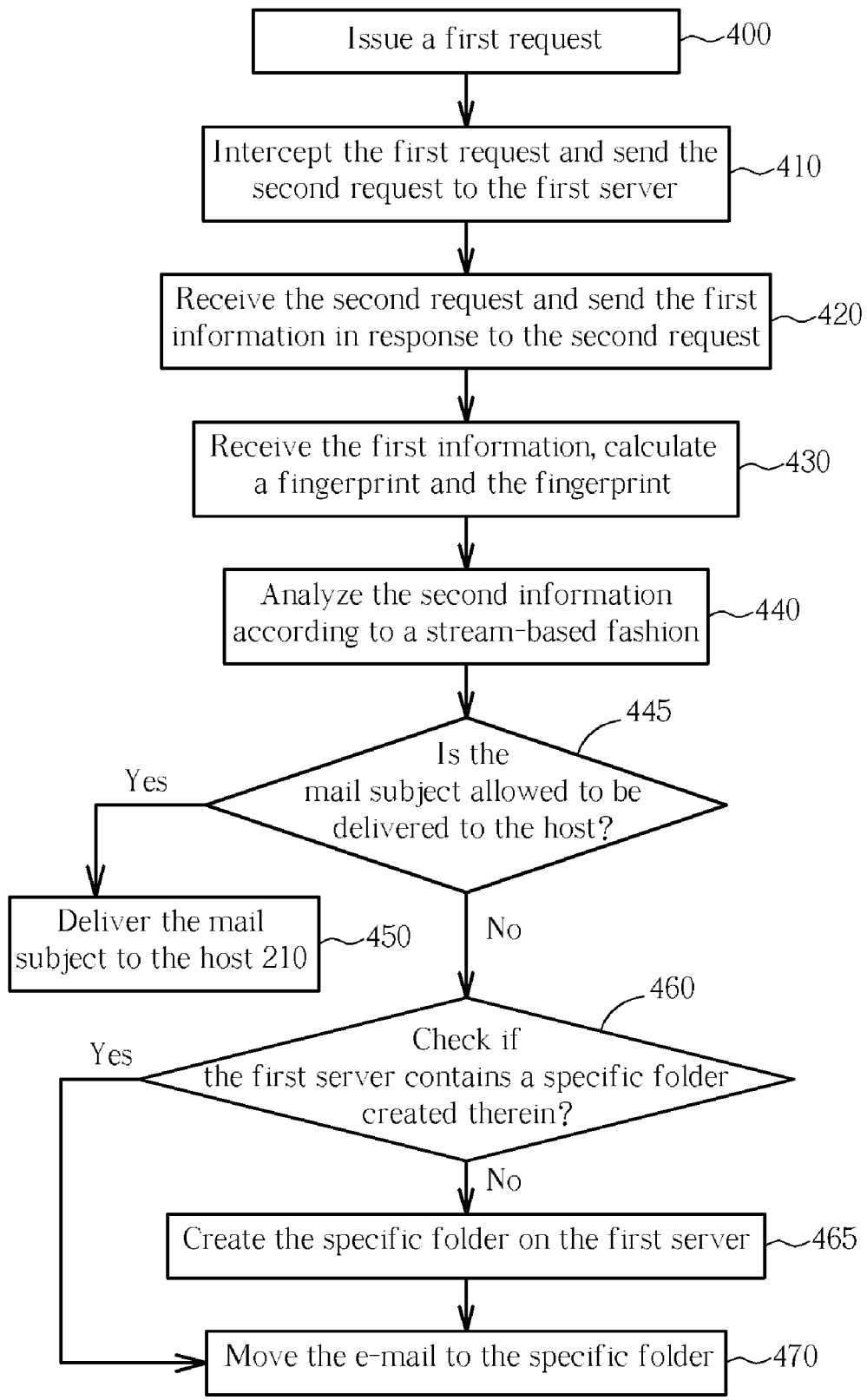
FIG. 4 is a flowchart of another method employed by the system 200 for processing an e-mail.

Please refer to FIG. 4 in conjunction with FIG. 2. FIG. 4 is a flowchart of another method employed by the system 200 for processing an e-mail. The e-mail processing is summarized as follows:

Step 400: Issue a first request. The host 210 issues a first request to get a mail subject of the e-mail.

Step 410: Intercept the first request and send the second request to the first server. The parser 220 intercepts the first request and sends the second request to the first server 230, wherein the second request will request the first server 230 to send a first information including both the mail subject and a partial mail content of the requested e-mail to the host 210.

Step 420: Receive the second request and send the first information in response to the second request. The first server 230 receives the specific request and sends the first information associated with the requested e-mail in response to the second request generated in reference to the first request.

Step 430: Receive the first information, calculate a fingerprint and output the fingerprint. The parser 220 receives the first information, utilizes the first information to calculate a fingerprint of the e-mail as the second information and outputs the fingerprint to the second server 240.

Step 440: Analyze the second information according to a stream-based fashion. The second server 240 references the received fingerprint to determine whether or not the mail subject is delivered to the host 210 and then outputs an analysis result.

Step 445: Is delivery of the mail subject to the host allowed? If yes, go to step 450; otherwise, go to step 460.

Step 450: Deliver the mail subject to the host 210. The parser 220 will deliver the mail subject to the host 210 if the received analysis result grants the mail subject delivery.

Step 460: Check if the first server contains a specific folder created therein. If yes, go to step 470; otherwise, go to step 465.

Step 465: Create the specific folder on the first server. The parser 220 sends a first command to the first server 230 for creating the specific folder on the first server 230.

Step 470: Move the e-mail to the specific folder. The parser 210 sends a second command to the first server 230 for moving the e-mail to the specific folder.

In this embodiment, the parser 220 further utilizes the first information to calculate a fingerprint of the e-mail as the second information (Step 430). The second server 240 utilizes the fingerprint to evaluate whether the requested e-mail is a spam mail and then generates the analysis result (Step 440). If the analysis result indicates that the e-mail is a not span mail, the parser 220 delivers the mail subject to the host 210 (Step 450). On the contrary, if the analysis result indicates that the e-mail is a span mail, the analysis result will indicate the parser 220 should not deliver the mail subject to the host 210. If the first server 230 has no folder specified for storing spam mails, the parser 220 initially sends a first command to the first server 230 for creating the specific folder on the first server (Steps 460 & 465), and then sends a second command to the first server 230 for moving the e-mail to the specific folder (Step 470). Additionally, supposing that the first server 230 has the specific folder specified for storing spam mails, the parser 220 directly sends a second command to the first server 230 for moving the e-mail identified as a spam mail to the specific folder (Steps 460 & 470).

Similarly, after the above steps are executed, the host 210 only shows mail subjects of the non-spam mails, and the spam mails are moved to the customized folder. The operation and functionality of the anti-spam scheme using the fingerprint are well known to those skilled in this art; therefore further description is not detailed for brevity.

Please note that the aforementioned embodiment of the present invention utilizes the white list, the black list, or the fingerprint to analyze the e-mail. However, this is not meant to be a limitation of the present invention. Other anti-spam schemes can be adopted and executed on the second server 240.

The present invention can analyze information associated with e-mails requested according to the IMAP protocol for identifying spam e-mails, and move identified spam mails to the customized folder automatically. The present invention not only solves the problem where the anti-spam function in a stream-based environment cannot analyze spam mails by the mail subjects only but also avoids the situation where the same mail must be verified many times by the network appliance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for processing an e-mail, the system comprising:
    a host, for issuing a first request to get a mail subject of the e-mail;
    a first sewer, coupled to the host, for sending a first information associated with the e-mail in response to a specific request associated with the first request, wherein the first information includes at least the mail subject and does not include all mail contents of the requested e-mail;
    a second server, coupled to the host, for analyzing a second information to determine whether or not the mail subject is allowed to be delivered to the host and then outputting an analysis result; and
    a gateway, coupled to the host, the first sewer, and the second server, for intercepting the first request from the host and generating the specific request to the first server, receiving the first information from the first server and generating the second information according to the received first information, outputting the second information to the second server, receiving the analysis result from the second server, and directing the mail subject to the host if the analysis result indicates the gateway should deliver the mail subject to the host.

2. The system of claim 1, wherein the first request complies with an IMAP protocol.

3. The system of claim 1, wherein the second information is identical to the first information, and the second server analyzes the second information according to a white list or a black list to generate the analysis result.

4. The system of claim 1, wherein the gateway fun her utilizes the first information to calculate a fingerprint of the e-mail as the second information, and the second server references the fingerprint of the e-mail to generate the analysis result.

5. The system of claim 1, wherein if the analysis result indicates the gateway should not deliver the mail subject to the host, the gateway further sends a first command to the first server for moving the e-mail to a specific folder.

6. The system of claim 5, wherein if the analysis result indicates the gateway should not deliver the mail subject to the host, the gateway further sends a second command to the first server for creating the specific folder on the first server.

7. The system of claim 1, wherein the second server analyzes the second information from the gateway.

8. A method for processing an e-mail, the method comprising:
    utilizing a host to issue a first request to get a mail subject of the e-mail;
    intercepting the first request and generating a specific request according to the first request;
    utilizing the specific request to request first information including the mail subject of the e-mail and a partial mail content of the e-mail;
    outputting the first information associated with the e-mail in response to the specific request;
    outputting a second information according to the first information;
    analyzing the second information to determine whether or not the mail subject should be delivered to the host and then outputting an analysis result; and
    directing the mail subject to the host if the analysis result grants a delivery of the mail subject to the host.

9. The method of claim 8, wherein the first request complies with an IMAP protocol.

10. The method of claim 8, wherein the second information is identical to the first information, and the step of analyzing the second information comprises:
    analyzing the second information according to a white list or a black list to generate the analysis result.

11. The method of claim 8, wherein the step of analyzing the second information further comprises:
    utilizing the first information to calculate a fingerprint of the e-mail as the second information; and
    utilizing the fingerprint of the e-mail to analyze the information to generate the analysis result.

12. The method of claim 8, further comprising:
    if the analysis result does not grant the delivery of the mail subject to the host, moving the e-mail to a specific folder.

13. The method of claim 12, further comprising:
    if the analysis result does not grant the delivery of the mail subject to the host, creating the specific folder.

* * * * *